United States Patent
Adachi

(10) Patent No.: US 10,797,551 B2
(45) Date of Patent: Oct. 6, 2020

(54) MOTOR AND COMPRESSOR HAVING INSULATOR AND STATOR CORE WITH NON-OVERLAPPING GROOVES

(71) Applicant: Mitsubishi Electric Corporation, Tokyo (JP)

(72) Inventor: Kazunori Adachi, Tokyo (JP)

(73) Assignee: Mitsubishi ElectricCorporation, Tokyo (JP)

(*) Notice: Subject to any disclaimer, the term of this patent is extended or adjusted under 35 U.S.C. 154(b) by 344 days.

(21) Appl. No.: 15/554,730

(22) PCT Filed: Jun. 8, 2015

(86) PCT No.: PCT/JP2015/066515
§ 371 (c)(1),
(2) Date: Aug. 31, 2017

(87) PCT Pub. No.: WO2016/199203
PCT Pub. Date: Dec. 15, 2016

(65) Prior Publication Data
US 2018/0048206 A1    Feb. 15, 2018

(51) Int. Cl.
H02K 3/32      (2006.01)
H02K 1/14      (2006.01)
(Continued)

(52) U.S. Cl.
CPC .............. *H02K 3/325* (2013.01); *H02K 1/148* (2013.01); *H02K 1/185* (2013.01); *H02K 3/345* (2013.01);
(Continued)

(58) Field of Classification Search
CPC ........ H02K 15/10; H02K 1/148; H02K 1/185; H02K 2203/06; H02K 3/325; H02K 3/345;
(Continued)

(56) References Cited

U.S. PATENT DOCUMENTS 9,793,774 B2 * 10/2017 Yokota ..................... H02K 3/34
10,396,613 B2 * 8/2019 Kanda ..................... H02K 3/28
(Continued)

FOREIGN PATENT DOCUMENTS

CN          1956291 A      5/2007
CN        201051684 Y      4/2008
(Continued)

OTHER PUBLICATIONS

Office action dated Nov. 27, 2018 issued in corresponding CN patent application No. 201610304898.0 (and English translation thereof).
(Continued)

*Primary Examiner* — Shawki S Ismail
*Assistant Examiner* — Demetries A Gibson
(74) *Attorney, Agent, or Firm* — Posz Law Group, PLC

(57) ABSTRACT

A motor enables an insulator and an iron core to be secured without a reduction in the efficiency of the motor. A motor includes an iron core and an insulator disposed on an axial end surface of the iron core. The iron core includes at least one of grooves on an outer circumferential portion. Each of the grooves is arranged in an axial direction of the iron core on the outer circumferential portion from the end surface. The insulator includes at least one of claws protruding downward in the axial direction from a surface in contact with the iron core. The claws are fitted into the grooves.

8 Claims, 7 Drawing Sheets

(51) Int. Cl.
*H02K 1/18* (2006.01)
*H02K 3/34* (2006.01)
*H02K 3/38* (2006.01)
*H02K 3/52* (2006.01)
*H02K 5/08* (2006.01)
*H02K 15/10* (2006.01)

(52) U.S. Cl.
CPC ............... *H02K 3/38* (2013.01); *H02K 3/522* (2013.01); *H02K 3/32* (2013.01); *H02K 3/34* (2013.01); *H02K 5/08* (2013.01); *H02K 15/10* (2013.01); *H02K 2203/06* (2013.01)

(58) Field of Classification Search
CPC ............ H02K 3/38; H02K 3/522; H02K 5/08; H02K 3/32; H02K 3/34
USPC .......................................................... 310/215
See application file for complete search history.

(56) References Cited

U.S. PATENT DOCUMENTS

| | | | | |
|---|---|---|---|---|
| 2004/0084988 | A1* | 5/2004 | Sheeran | H02K 1/148 29/596 |
| 2005/0212377 | A1* | 9/2005 | Wang | H02K 3/522 310/260 |
| 2006/0028092 | A1 | 2/2006 | Wang et al. | |
| 2008/0296996 | A1 | 12/2008 | Wang et al. | |
| 2012/0080976 | A1 | 4/2012 | Oka et al. | |
| 2012/0306311 | A1* | 12/2012 | Endo | H02K 1/148 310/216.113 |
| 2013/0043743 | A1* | 2/2013 | Kim | H02K 3/34 310/43 |
| 2013/0069479 | A1* | 3/2013 | Li | H02K 1/148 310/216.009 |
| 2013/0169085 | A1* | 7/2013 | Taema | H02K 3/28 310/71 |
| 2014/0015349 | A1 | 1/2014 | Chamberlin et al. | |
| 2015/0035404 | A1 | 2/2015 | Taema | |

FOREIGN PATENT DOCUMENTS

| | | |
|---|---|---|
| DE | 10 2008 023 923 A1 | 1/2009 |
| JP | 2011-135640 A | 7/2011 |
| JP | 2012-075215 A | 4/2012 |
| JP | 2012-095492 A | 5/2012 |
| JP | 5122002 B2 | 11/2012 |
| JP | 2013-132110 A | 7/2013 |
| JP | 2013-158163 A | 8/2013 |

OTHER PUBLICATIONS

Office Action dated Feb. 27, 2018 issued in corresponding CN patent application No. 201610304898.0 (and English translation).
International Search Report of the International Searching Authority dated Aug. 18, 2015 for the corresponding international application No. PCT/JP2015/066515 (and English translation).
Extended European Search Report dated Apr. 24, 2017 issued in corresponding EP patent application No. 15864315.5.
Office Action dated May 25, 2020 issued in corresponding EP patent application No. 15864315.5.

* cited by examiner

MOTOR AND COMPRESSOR HAVING INSULATOR AND STATOR CORE WITH NON-OVERLAPPING GROOVES

CROSS REFERENCE TO RELATED APPLICATION

This application is a U.S. national stage application of International Application No. PCT/JP2015/066515, filed on Jun. 8, 2015, the contents of which are incorporated herein by reference.

TECHNICAL FIELD

The present invention relates to a motor including an iron core and an insulator that constitute a stator, and a compressor including the motor.

BACKGROUND

A stator of a motor that is known in the art is provided with a stator core including plural iron cores that are annularly arranged, winding coils wound around the respective iron cores, and insulators that insulate the winding coils from the iron cores. In such a stator core, as shown in FIG. 10, an insulator protrusion 14a is typically disposed on the lower end surface of each insulator, and an insulator coupling hole 15a is formed in the upper end surface of each iron core 5a. It has been disclosed that the insulator protrusion 14a is fitted into the insulator coupling hole 15a and an insulator 6a is thereby attached to the corresponding iron core 5a, as shown in FIG. 11 (see, for example, Patent Literature 1).

In a method of securing iron cores and insulators that constitute a stator of a motor, attachment portions extending in the axial direction of the iron cores are formed on each insulator. It has been disclosed that both axial end portions of the iron cores are circumferentially interposed between the attachment portions, and the insulators and the iron cores are thereby secured (see, for example, Patent Literature 2).

Patent Literature

Patent Literature 1: Japanese Patent No. 5122002
Patent Literature 2: Japanese Unexamined Patent Application Publication No. 2012-75215

In the stator of a motor disclosed in Patent Literature 1, the protrusion is disposed on the surface of each insulator that faces the upper end surface of the corresponding iron core, and the hole, into which each insulator is inserted, is formed in the upper end surface of the corresponding iron core. The securing method of inserting the protrusion of each insulator into the hole of the corresponding iron core requires the hole to be formed in each iron core. The hole causes a problem in that the flow of magnetic force is hindered, which results in a reduction in efficiency of the motor.

In the stator of a motor disclosed in Patent Literature 2, both end portions of the iron cores are circumferentially interposed between the attachment portions disposed on the insulators, and this causes a problem in that a space available for windings of the iron cores is reduced, which results in a reduction in efficiency of the motor.

SUMMARY

The present invention has been made to address the above problems, and an object of the present invention is to provide a motor and a compressor that prevent the space available for the windings from being reduced without hindering the flow of magnetic force.

A motor according to the present invention includes an iron core and an insulator disposed on an axial end surface of the iron core. The iron core includes at least one groove on an outer circumferential portion. The groove is arranged in an axial direction of the iron core on the outer circumferential portion from the end surface of the iron core. The insulator includes at least one first protrusion protruding downward in the axial direction from a surface in contact with the iron core. The first protrusion is fitted into the groove.

According to the present invention, the iron core is provided with at least one groove arranged in the axial direction of an outer-diameter-side surface from the end surface, the insulator is provided with at least one first protrusion protruding downward in the axial direction from the surface in contact with the iron core, and the first protrusion is fitted into the groove. With this configuration, a motor that prevents the space available for the windings from being reduced without hindering the flow of magnetic force can be obtained.

DETAILED DESCRIPTION

Figure 1:
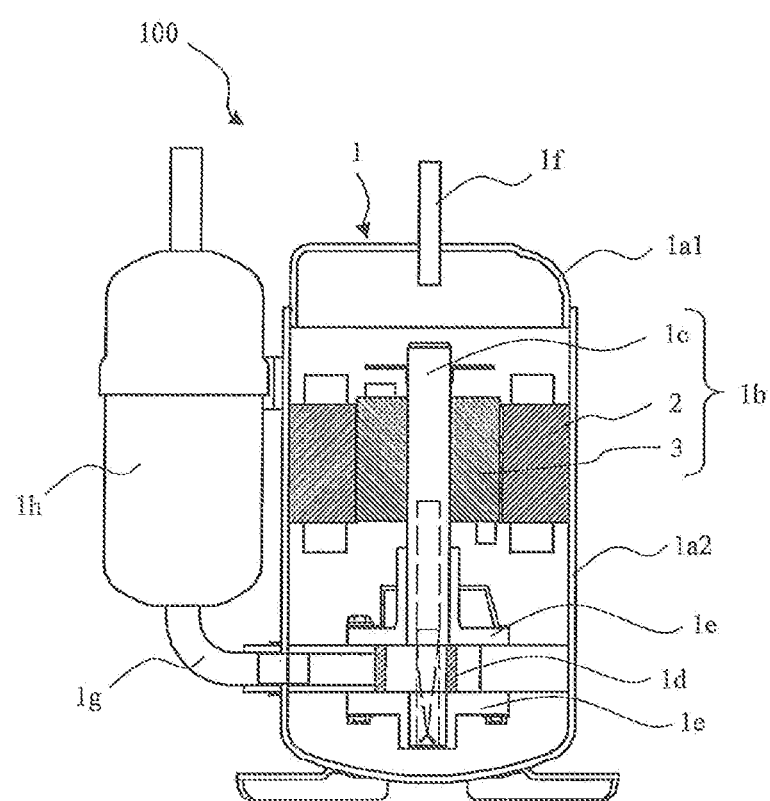
FIG. 1 is a schematic diagram of a compressor equipped with a motor according to Embodiment 1 of the present invention.

Embodiments of a motor according to the present invention will hereinafter be described with reference to the drawings. The drawings show exemplary embodiments and do not limit the present invention. In the drawings, like symbols designate like or corresponding components. This is common throughout the disclosure. In the drawings, components may not be drawn to scale.

Embodiment 1

[Structure of Compressor]

Figure 2A:
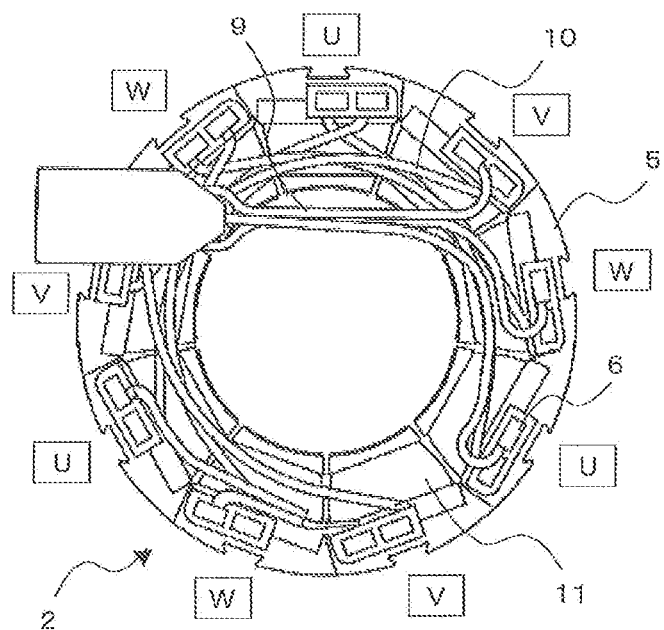
FIG. 2A is a schematic top view of a stator of the motor according to Embodiment 1 of the present invention.
Figure 2B:
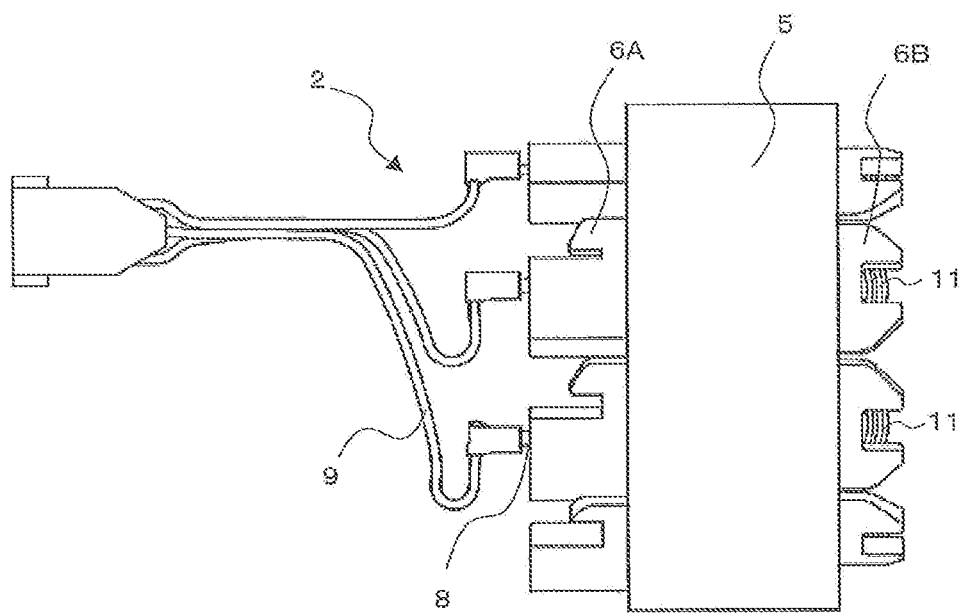
FIG. 2B is a schematic side view of the stator of the motor according to Embodiment 1 of the present invention.

FIG. 1 is a schematic diagram of a compressor equipped with a motor according to Embodiment 1 of the present invention. FIG. 2A is a schematic top view of a stator of the motor according to Embodiment 1 of the present invention. FIG. 2B is a schematic side view of the stator of the motor according to Embodiment 1 of the present invention. As shown in FIG. 1 to FIG. 2B, a compressor 100 includes a sealed container 1, a suction pipe 1g through which refrigerant is supplied to the sealed container 1, a liquid reservoir 1h connected to the suction pipe 1g, a compression mechanism 1d that is connected to the suction pipe 1g and compresses the refrigerant, a rotatable shaft 1c, a rotor 3 joined to the shaft 1c, a stator 2 that causes the rotor 3 to rotate, and a discharge pipe 1f through which the compressed refrigerant is discharged from the sealed container 1. The shaft 1c, the stator 2, and the rotor 3 constitute a motor 1b.

(Sealed Container 1)

The sealed container 1 forms the contour of the compressor 100. In the sealed container 1, at least the compression mechanism 1d, the motor 1b, and other components are disposed. The sealed container 1 includes an upper shell 1a1 and a lower shell 1a2 that constitutes the contour of the body and the lower portion of the compressor 100.

The upper shell 1a1 is a shell on an end side that forms the upper portion of the sealed container 1. For example, the upper shell 1a1 is subjected to a drawing process and has a shape approximating a hemisphere. The discharge pipe 1f through which the inside of the sealed container 1 communicates with the outside of the sealed container 1 is connected to the upper shell 1a1.

The lower shell 1a2 forms the intermediate portion and the lower portion of the sealed container 1. For example, the lower shell 1a2 has a cylindrical shape with a bottom, in which the lower side is blocked. In other words, in the lower shell 1a2, an opening port is formed on the upper side and the upper shell 1a1 is press-fitted; the lower side is blocked to store a refrigerating machine oil used to reduce the sliding friction of the compression mechanism 1d. The suction pipe 1g through which the refrigerant is supplied to the sealed container 1 is connected to the lower shell 1a2. The stator 2 of the motor 1b is attached to the inner circumferential surface of the lower shell 1a2. The compression mechanism 1d is attached to the inner circumferential surface of the lower shell 1a2 below the surface to which the stator 2 is attached.

(Suction Pipe 1g and Liquid Reservoir 1h)

The suction pipe 1g is connected at one side to the lower shell 1a2 of the sealed container 1 so as to communicate with a cylinder of the compression mechanism 1d. The suction pipe 1g is connected at the other side to the liquid reservoir 1h. The liquid reservoir 1h functions as a muffler for reducing the sound of the refrigerant that flows into the compressor 100. The liquid reservoir 1h also functions as an accumulator that can store liquid refrigerant. The liquid reservoir 1h is connected at one side to the suction pipe 1g.

(Compression Mechanism 1d)

The compression mechanism 1d compresses the refrigerant that is supplied through the liquid reservoir 1h and the suction pipe 1g and releases the refrigerant to the inside of the sealed container 1. The compression mechanism 1d is attached to the inner surface of the lower shell 1a2. The compression mechanism 1d is provided with the cylinder for compressing the refrigerant supplied through the suction pipe 1g and a piston that slidably rotates in the cylinder. The piston is joined to the shaft 1c and makes an eccentric motion in the cylinder. The compression mechanism 1d is provided, at the upper end surface side and the lower end surface side, with bearings 1e that rotatably support the shaft 1c.

(Motor 1b)

The motor 1b includes the shaft 1c that is joined at the lower end side to the bearings 1e of the compression mechanism 1d, the rotor 3 that is secured to the shaft 1c and transfers its own rotation to the shaft 1c, and the stator 2 around which winding coils 11 in multi-layers (see FIG. 2B) are wound. The rotor 3 is secured to the shaft 1c above the position at which the shaft 1c is joined to the compression mechanism 1d. The shaft 1c rotates when the rotor 3 rotates, thereby causing the piston of the compression mechanism 1d to rotate. The rotor 3 is provided with a permanent magnet (not shown) and is rotatably supported by the shaft 1c. The rotor 3 is supported so as to be a predetermined distance away from the inside of the stator 2. The stator 2 causes the rotor 3 to rotate and is disposed such that the outer circumferential surface of the stator 2 is secured to the inner circumferential surface of the lower shell 1a2.

As shown in FIG. 2A and FIG. 2B, the stator 2 includes iron cores 5 that are formed of plural electrical steel plates, insulators 6 that are attached to the respective iron cores 5, and the winding coils 11 that are wound in multi-layers around the respective iron cores 5 with the insulators 6 interposed therebetween. The iron cores 5 are each obtained by stacking the electrical steel plates and are annularly arranged. The insulators 6 used to insulate the winding coils 11 from the iron cores 5 are attached to the iron cores 5.

The insulators 6 are made of, for example, resin to achieve the insulation between the winding coils 11 and the iron cores 5. Among the insulators 6, the insulators 6 on the side of the compression mechanism 1d are referred to as L-side insulators 6B, and among the insulators 6, the insulators 6 on the side of the upper shell 1a1 are referred to as U-side insulators 6A. In other words, portions of the insulators 6 that are located below the lower end surfaces of the iron cores 5 are referred to as the L-side insulators 6B, and portions of the insulators 6 that are located above the upper end surfaces of the iron cores 5 are referred to as the U-side insulators 6A.

As shown in FIG. 2A and FIG. 2B, at the L-side insulators 6B, part of the winding coils 11 that are wound around the L-side insulators 6B can be seen when the stator 2 is viewed from the outer circumferential side of the stator 2. In the U-side insulators 6A, cavities (not shown) are formed and mag-mates 8, to which lead wires 9 used to supply electricity to U-phase coils, V-phase coils, and W-phase coils are connected, are embedded. The U-phase coils, the V-phase coils, and the W-phase coils are electrically connected to one another through jumper wires 10. The winding coils 11 are wound in multi-layers around the iron cores 5 with the U-side insulators 6A and the L-side insulators 6B interposed therebetween. When an electric current is supplied to the winding coils 11, the stator 2 functions as an electromagnet, and interaction between the permanent magnet provided in the rotor 3 and the electromagnet creates a turning force of the rotor 3.

(Discharge Pipe 1*f*)

The discharge pipe 1*f* is a pipe through which high-temperature and high-pressure refrigerant in the sealed container 1 that is compressed by the compression mechanism 1*d* is discharged to the outside. The discharge pipe 1*f* is connected at one side to, for example, a four-way valve, not shown, which is used to switch channels, and at the other side to the upper shell 1*a*1 such that the inside of the sealed container 1 communicates with the outside of the sealed container 1.

Figure 3A:
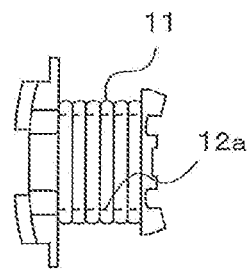
FIG. 3A is a schematic bottom view of one of iron cores of the motor according to Embodiment 1 of the present invention.
Figure 3B:
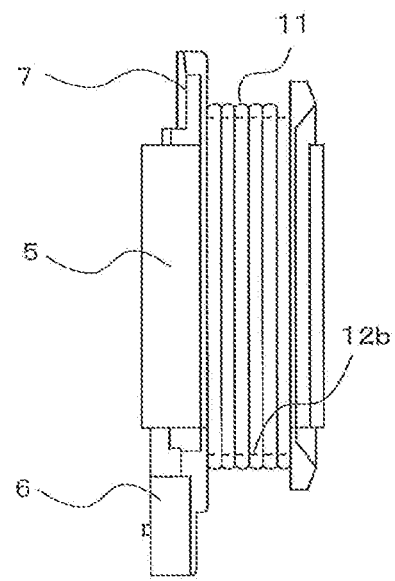
FIG. 3B is a schematic side view of the iron core of the motor according to Embodiment 1 of the present invention.
Figure 3C:
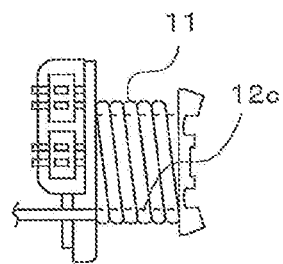
FIG. 3C is a schematic top view of the iron core of the motor according to Embodiment 1 of the present invention.

FIG. 3A is a schematic bottom view of one of the iron cores of the motor according to Embodiment 1 of the present invention. FIG. 3B is a schematic side view of the iron core of the motor according to Embodiment 1 of the present invention. FIG. 3C is a schematic top view of the iron core of the motor according to Embodiment 1 of the present invention. As shown in FIG. 3A to FIG. 3C, each iron core 5 is provided with a short-L-side winding portion 12*a* around which a coil is wound at the lower portion of the iron core 5, a long-side winding portion 12*b* around which the coil is wound at the sides of the iron core 5, and a short-U-side winding portion 12*c* around which the coil is wound at the upper portion of the iron core 5.

At the short-L-side winding portion 12*a*, the winding coil 11 is wound so as to be parallel with the short-L-side winding portion 12*a*, and at the long-side winding portion 12*b*, the winding coil 11 is wound so as to be parallel with the long-side winding portion 12*b*. At the short-U-side winding portion 12*c*, on the other hand, the winding coil 11 is wound such that the winding is inclined by one pitch. In this way, the winding coil 11 is wound in multi-layers around the iron core 5.

Figure 4:
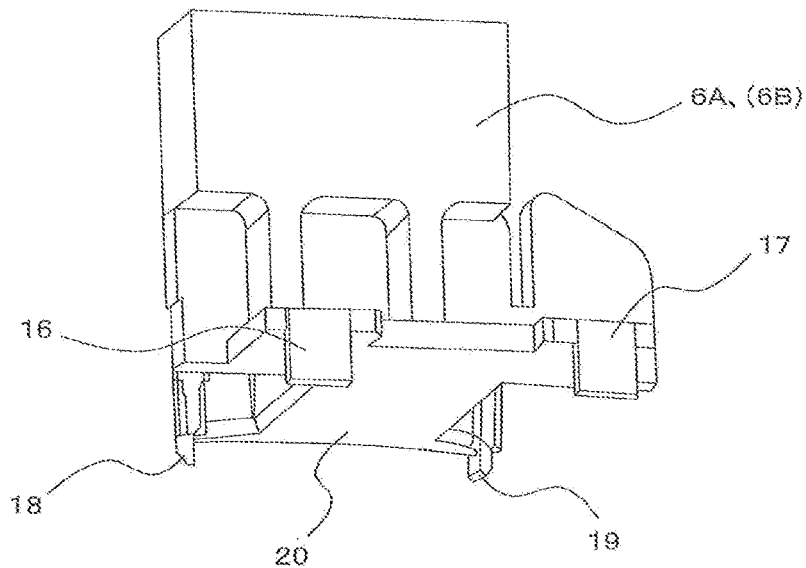
FIG. 4 is an enlarged perspective view of one of insulators of the motor according to Embodiment 1 of the present invention.

FIG. 4 is an enlarged perspective view of one of the insulators of the motor according to Embodiment 1 of the present invention. The lower surface of each U-side insulator 6A that comes into contact with the corresponding iron core 5, as shown in FIG. 4, is referred to as an insulator-side iron-core contact surface 20. At both end sides of the outer edge of the insulator-side iron-core contact surface 20 (outer circumferential side of the iron cores 5), a flat claw 16 and a flat claw 17 protrude downward in the axial direction. Likewise, at both end sides of the inner edge of the insulator-side iron-core contact surface 20 (inner diameter side of the iron cores 5), a claw 18 and a claw 19 protrude downward in the axial direction. Each L-side insulator 6B has, at the lower surface side, the same structure as the above U-side insulator 6A. More specifically, the lower surface of each L-side insulator 6B that comes into contact with the corresponding iron core 5 is referred to as the insulator-side iron-core contact surface 20. At both end sides of the outer edge of the insulator-side iron-core contact surface 20 (side of the iron cores 5), the flat claw 16 and the flat claw 17 protrude downward in the axial direction. Likewise, at both end sides of the inner edge of the insulator-side iron-core contact surface 20 (inner diameter side of the iron cores 5), the claw 18 and the claw 19 protrude downward in the axial direction. The claw 16 and the claw 17 correspond to "first protrusions" in the present invention. The claw 18 and the claw 19 correspond to "second protrusions" in the present invention.

Figure 5:
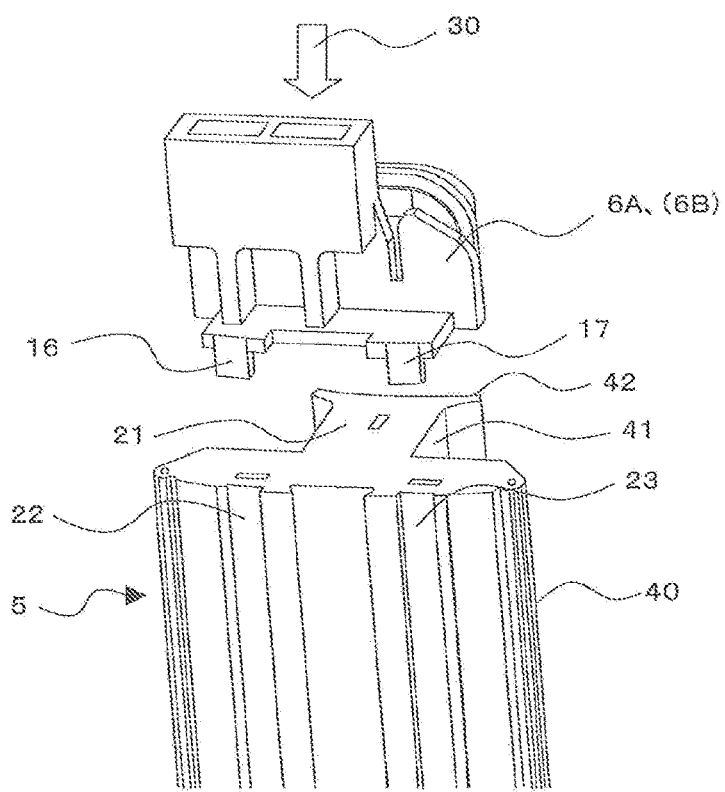
FIG. 5 is an enlarged perspective view showing a method of attaching one of the insulators to one of the iron cores of the motor according to Embodiment 1 of the present invention.

FIG. 5 is an enlarged perspective view showing a method of attaching one of the insulators to one of the iron cores of the motor according to Embodiment 1 of the present invention. As shown in FIG. 5, each iron core 5 includes a core back portion 40 extending in the circumferential direction, a tooth portion 41 protruding in the central direction from the middle portion of the core back portion 40, and a tooth end portion 42 located at an end of the tooth portion 41. The axial end surfaces of each iron core 5 that come into contact with the corresponding insulators are referred to as iron-core-side insulator contact surfaces 21. The core back portion 40 is provided with a groove 22 and a groove 23 in the outer circumferential portion. Each of the grooves 22 and 23 is arranged in the axial direction of the outer circumferential portion from the iron-core-side insulator contact surfaces 21. The groove 22 and the groove 23 are arranged at parts of the outer circumferential portion of the core back portion 40 that do not overlap a projection of the tooth portion 41 onto a plane of the core back portion 40.

Each U-side insulator 6A and each L-side insulator 6B are attached to the corresponding iron core 5 from above the iron core 5 as shown by the direction of an arrow 30. At this time, the insulator-side iron-core contact surface 20 adheres to one of the iron-core-side insulator contact surfaces 21.

Figure 6:
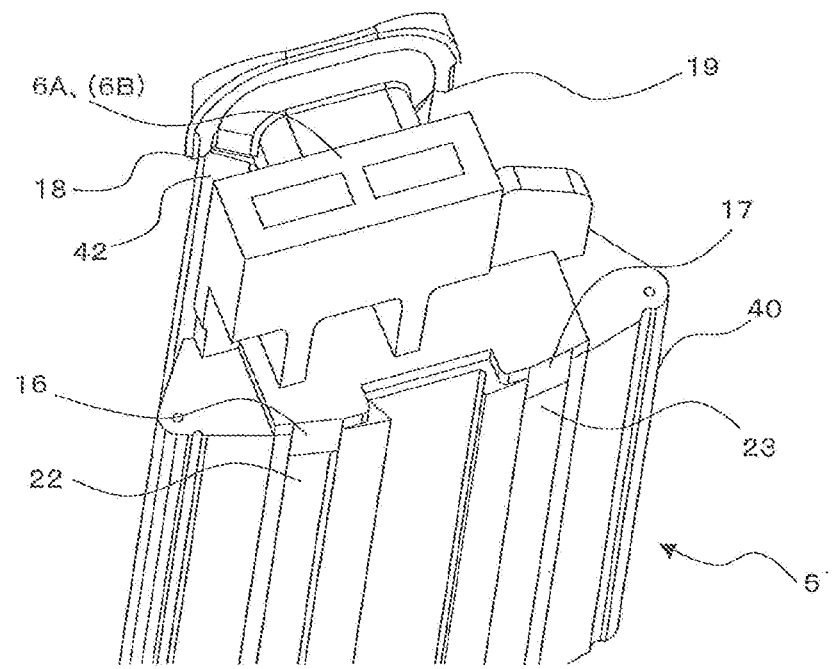
FIG. 6 is an enlarged perspective view showing a state where one of the insulators is attached to one of the iron cores of the motor according to Embodiment 1 of the present invention.

FIG. 6 is an enlarged perspective view showing a state where one of the insulators is attached to one of the iron cores of the motor according to Embodiment 1 of the present invention. As shown in FIG. 6, the claw 16 and the claw 17 are respectively fitted into and secured to the groove 22 and the groove 23 by interference fitting or transition fitting. At this time, the claw 18 and the claw 19 of each U-side insulator 6A are in contact with the inner circumferential surface of the tooth end portion 42. Each U-side insulator 6A is thus attached to the corresponding iron core 5 such that the iron core 5 is held by the claws 16, 17, 18, and 19. Each L-side insulator 6B is attached to the corresponding iron core 5 in the same manner as the above U-side insulator 6A. That is, each U-side insulator 6A is disposed on one end surface of the corresponding iron core 5, and each L-side insulator 6B is disposed on the other end surface of the corresponding iron core 5.

The claw 18 and the claw 19 are in contact with the inner circumferential surface of the tooth end portion 42 at parts of the tooth end portion 42 that do not overlap a projection of the tooth portion 41 onto a plane of the tooth end portion 42. The motor 1*b* is provided with the rotor 3 on the inner circumferential side of the iron cores 5 that are annularly arranged. The claw 18 and the claw 19, however, are disposed at positions at which the claw 18 and the claw 19 do not come into contact with the rotor 3. The claw 16 is contained within the groove 22 so as not to protrude from the outer circumferential surface of the iron core 5. Likewise, the claw 17 is contained within the groove 23 so as not to protrude from the outer circumferential surface of the iron core 5.

Although the claw 16 and the claw 17 are flat in Embodiment 1, the present invention is not limited thereto, and the claw 16 and the claw 17 may be formed into an arc shape or a rod-like shape. Embodiment 1 illustrates the case where the insulator 6 is provided with the two claws on the inner diameter side of the iron core 5 and the two claws on the outer diameter side of the iron core 5. The present invention, however, is not limited thereto. In the case where the claws are long and wide, the insulator 6 can be stably attached to the iron core 5, and the insulator 6 may accordingly be provided with one of the claws on the inner diameter side of the iron core 5 and another claw on the outer diameter side of the iron core 5. In the case where the claws are short and narrow, the insulator 6 may be provided with three or more of the claws on the inner diameter side of the iron core 5 and three or more of the claws on the outer diameter side of the iron core 5.

[Effect of Embodiment 1]

Thus, according to Embodiment 1, the motor 1b includes the iron cores 5, and the insulators 6 disposed on the axial end surfaces of the respective iron cores 5, each iron core 5 is provided with at least one of the grooves 22 and 23 in the outer circumferential portion, each of the grooves 22 and 23 is arranged in the axial direction of the outer circumferential surface from the end surfaces, each insulator 6 is provided with at least one of the claws 16 and 17 protruding downward in the axial direction from the surface in contact with the corresponding iron core 5, and the claws 16 and 17 are fitted into the grooves 22 and 23. This configuration eliminates the need for providing, on the axial end surfaces of the iron cores, holes for use in the attachment of the insulators. A motor that prevents the space available for the windings from being reduced without hindering the flow of magnetic force can thereby be obtained.

Each iron core 5 includes the core back portion 40 extending in the circumferential direction, the tooth portion 41 protruding in the central direction from the middle portion of the core back, and the tooth end portion 42 located at an end of the tooth portion 41. Each insulator 6 includes at least one of the claws 18 and 19 protruding downward in the axial direction from the surface in contact with the corresponding iron core 5. The claws 18 and 19 are in contact with the inner circumferential surface of the tooth end portion 42, and the insulators 6 hold the respective iron cores 5. This configuration enables the insulators to be stably attached to the respective iron cores 5.

The claw 18 and the claw 19 are in contact with the inner circumferential surface of the tooth end portion 42 at parts of the tooth end portion 42 that do not overlap the projection of the tooth portion 41 onto the plane of the tooth end portion 42. This configuration achieves the effect of not hindering the flow of magnetic force created in the iron cores 5.

Each iron core 5 includes the core back portion 40 extending in the circumferential direction, the tooth portion 41 protruding in the central direction from the middle portion of the core back, and the tooth end portion 42 located at an end of the tooth portion 41. The grooves 22 and 23 are arranged at parts of the outer circumferential portion of the core back portion 40 that do not overlap the projection of the tooth portion 41 onto the plane of the core back portion 40. This configuration achieves the effect of not hindering the flow of magnetic force created in the iron cores 5.

The rotor 3 that is rotatably disposed on the inner circumferential side of the iron cores 5 is provided. The claw 18 and the claw 19 are disposed at positions at which the claw 18 and the claw 19 do not come into contact with the rotor 3. This configuration achieves the effect that the claw 18 and the claw 19 do not interfere with the rotor 3 and the rotor 3 can efficiently rotate.

Embodiment 2

The basic configuration of a motor 1b according to Embodiment 2 is the same as the motor 1b according to Embodiment 1. Embodiment 2 will accordingly be described below with attention focused on a difference from Embodiment 1. The difference between Embodiment 1 and Embodiment 2 is that each insulator is secured to a corresponding iron core with two claws provided in the insulator.

Figure 7:
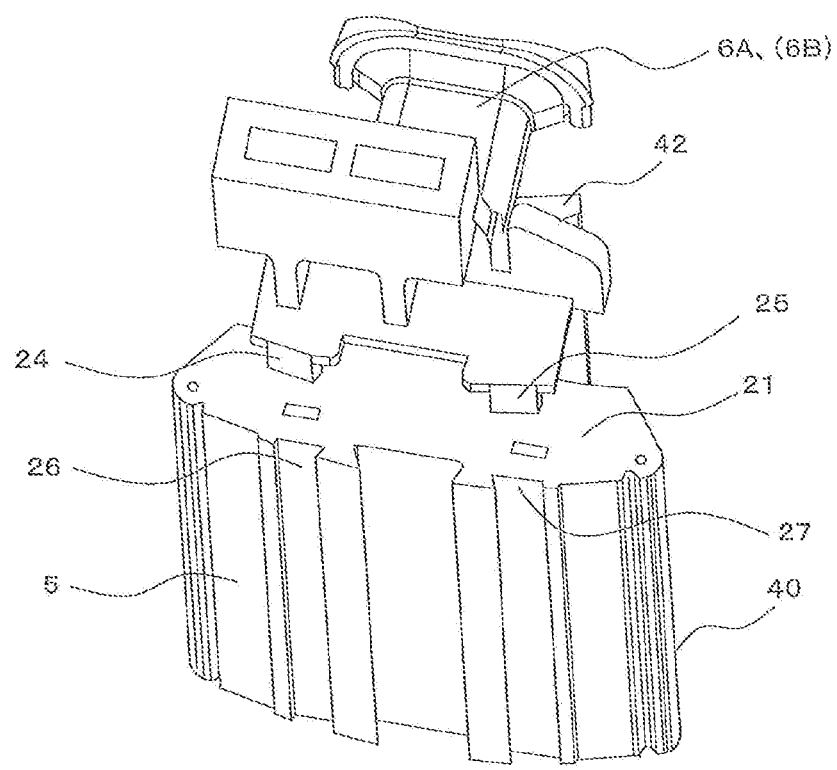
FIG. 7 is an enlarged perspective view showing a method of attaching one of insulators to one of iron cores of a motor according to Embodiment 2 of the present invention.

FIG. 7 is an enlarged perspective view showing a method of attaching one of the insulators to one of the iron cores of the motor according to Embodiment 2 of the present invention. As shown in FIG. 7, at both end sides of the outer edge of the lower surface of each U-side insulator 6A (outer circumferential side of the iron cores 5), a claw 24 and a claw 25 protrude downward in the axial direction. The claw 24 and the claw 25 are trapezoidal in cross section. Each L-side insulator 6B has the same structure as the above U-side insulator 6A.

The core back portion 40 of each iron core 5 is provided with a groove 26 and a groove 27 in the outer circumferential portion. Each of the grooves 26 and 27 is arranged in the axial direction of the outer circumferential portion from the iron-core-side insulator contact surfaces 21. The groove 26 and the groove 27 are trapezoidal in cross section. The groove 26 and the groove 27 are arranged at parts of the outer circumferential portion of the core back portion 40 that do not overlap a projection of a tooth portion (not shown) onto a plane of the core back portion 40.

When the trapezoidal claw 24 of each U-side insulator 6A is fitted into the trapezoidal groove 26 and the trapezoidal claw 25 of each U-side insulator 6A is fitted into the trapezoidal groove 27, the positions of each U-side insulator 6A in the circumferential direction and the radial direction are determined with respect to the corresponding iron core 5. Each U-side insulator 6A is secured to the corresponding iron core 5 in the axial direction by the interference fitting or the transition fitting. Each L-side insulator 6B is attached to the corresponding iron core 5 in the same manner as the above U-side insulator 6A. That is, each U-side insulator 6A is disposed on one end surface of the corresponding iron core 5, and each L-side insulator 6B is disposed on the other end surface of the corresponding iron core 5. The claw 24 does not protrude in the outer diameter direction from the groove 26. Likewise, the claw 25 does not protrude in the outer diameter direction from the groove 27.

[Effect of Embodiment 2]

Thus, according to Embodiment 2, the claws 24 and 25 and the grooves 26 and 27 are trapezoidal in cross section. This configuration enables the insulators to be stably secured to the respective iron cores, in addition to the effects of Embodiment 1. Moreover, the configuration eliminates the need for providing each insulator with a claw on the inner edge side, thereby achieving the effect of reducing the number of components.

Embodiment 3

The basic configuration of a motor 1b according to Embodiment 3 is the same as the motor 1b according to Embodiment 1. Embodiment 3 will accordingly be described below with attention focused on a difference from Embodiment 1. The difference between Embodiment 1 and Embodiment 3 is that each insulator is provided with a hole and each iron core is provided with protrusions.

Figure 8:
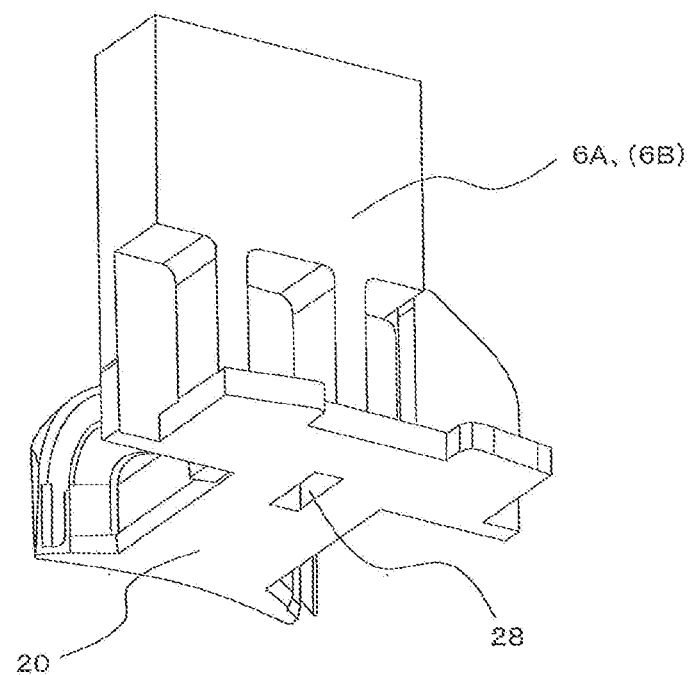
FIG. 8 is an enlarged perspective view of one of insulators of a motor according to Embodiment 3 of the present invention.

FIG. 8 is an enlarged perspective view of one of the insulators of the motor according to Embodiment 3 of the present invention. As shown in FIG. 8, each U-side insulator 6A is provided with a protrusion insertion hole 28 in the insulator-side iron-core contact surface 20. Likewise, each L-side insulator 6B is provided with the protrusion insertion hole 28 in the insulator-side iron-core contact surface 20.

Figure 9:
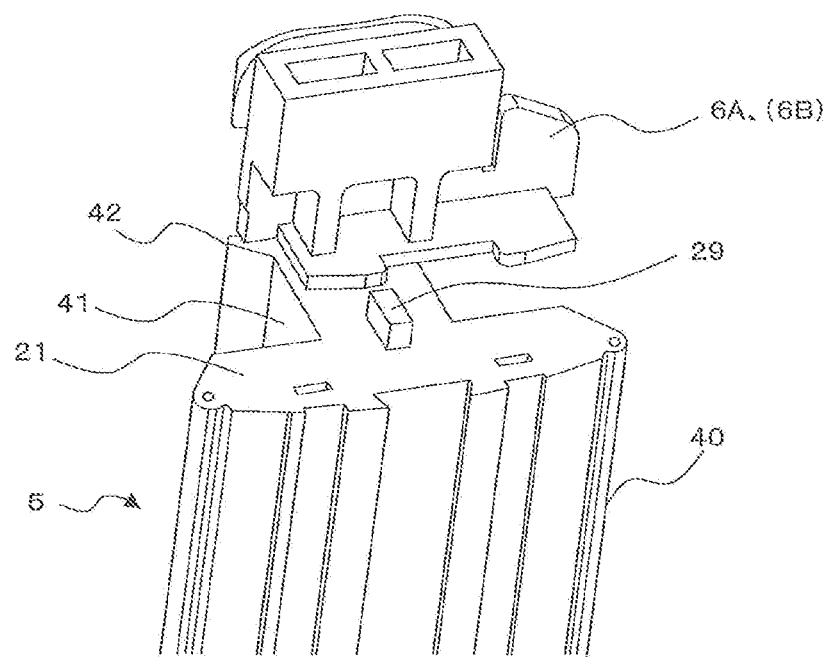
FIG. 9 is an enlarged perspective view showing a method of attaching one of the insulators to one of iron cores of the motor according to Embodiment 3 of the present invention.
Figure 10:
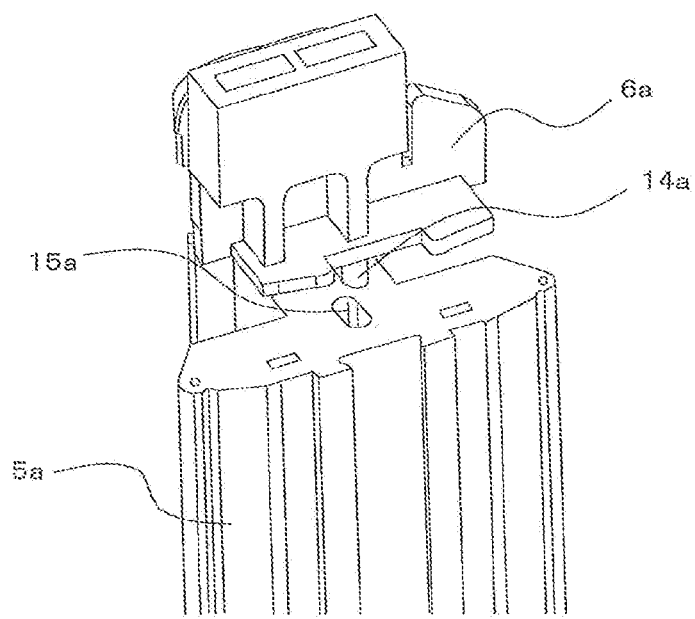
FIG. 10 is an enlarged perspective view showing a method of attaching an insulator to an iron core of an existing motor.
Figure 11:
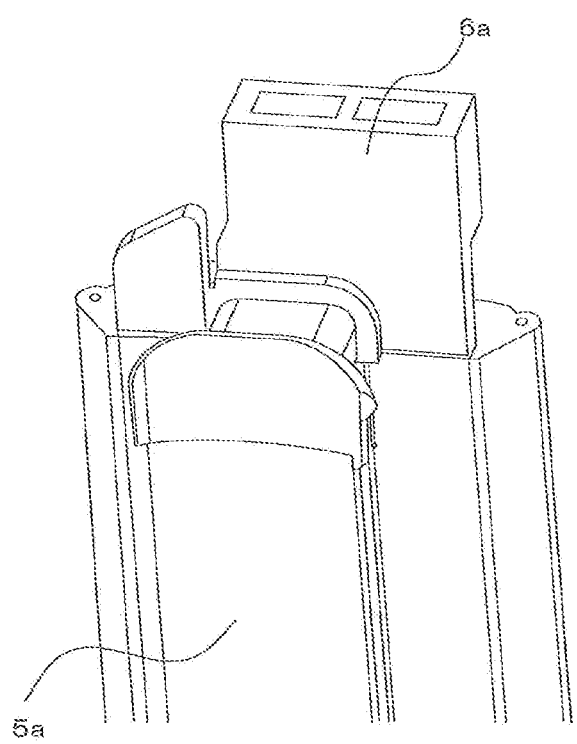
FIG. 11 is an enlarged perspective view showing a state where the insulator is attached to the iron core of the existing motor.

FIG. 9 is an enlarged perspective view showing a method of attaching one of the insulators to one of the iron cores of the motor according to Embodiment 3 of the present invention. As shown in FIG. 9, each iron core 5 is provided, on the iron-core-side insulator contact surfaces 21, with protruding portions 29 that protrude in the axial direction. Each U-side insulator 6A is secured to the corresponding iron core 5 by fitting one of the protruding portions 29 into the protrusion insertion hole 28. Each L-side insulator 6B is secured to the corresponding iron core 5 in the same manner.

[Effect of Embodiment 3]

Thus, according to Embodiment 3, the motor 1b includes the iron cores 5, and the insulators 6 disposed on the axial end surfaces of the respective iron cores 5, each iron core is provided, on at least one of the upper end surface or the lower end surface, with one of the protruding portions 29 that protrudes in the axial direction, each insulator 6 is provided with the protrusion insertion hole 28 in the lower end surface, and the protruding portion 29 is fitted into the protrusion insertion hole 28. This configuration eliminates the need for providing, on the axial end surfaces of the iron cores, holes for use in the attachment of the insulators. A motor that prevents the efficiency of the motor from being reduced without hindering the flow of magnetic force can thereby be obtained.

Although Embodiments 1 to 3 are described above, the present invention is not limited to the descriptions of the embodiments. For example, all or part of the embodiments can be combined.

The invention claimed is:

1. A motor comprising:
an iron core; and
an insulator disposed on an axial end surface of the iron core,
wherein the iron core includes a plurality of grooves on an outer circumferential portion,
wherein the plurality of grooves are arranged in an axial direction of the iron core on the outer circumferential portion from the end surface of the iron core,
wherein the iron core includes a core back portion extending in a circumferential direction, a plurality of tooth portions each protruding in a central direction from a middle portion of the core back portion, and a plurality of tooth end portions each located at an end of each of the plurality of tooth portions,
wherein the insulator includes a plurality of first protrusions protruding in the axial direction from a surface in contact with the iron core,
wherein the plurality of first protrusions are contained within the plurality of grooves,
wherein the insulator includes at least one second protrusion protruding in the axial direction from the surface in contact with the iron core,
wherein the second protrusion is in contact with an inner circumferential surface of the plurality of tooth end portions, and the insulator holds the iron core,
wherein two of the plurality of grooves are disposed with respect to each one of the plurality of tooth portions, and
wherein the two of the plurality of grooves are arranged at positions on an outer circumferential surface of the core back portion that do not overlap with a projection of the each one of the plurality of tooth portions onto a plane of the core back portion.

2. The motor of claim 1,
wherein the second protrusion is in contact with the inner circumferential surface of the plurality of tooth end portions at a part of the plurality of tooth end portions that does not overlap a projection of the plurality of tooth portions onto a plane of each of the plurality of tooth end portions.

3. The motor of claim 1, further comprising
a rotor that is rotatably disposed on an inner circumferential side of the iron core,
wherein the second protrusion is disposed at a position at which the second protrusion does not come into contact with the rotor.

4. The motor of claim 1,
wherein the first protrusion and the plurality of grooves are trapezoidal in cross section.

5. The motor of claim 1,
wherein the first protrusion is contained within the plurality of grooves so as not to protrude from an outer circumferential surface of the iron core.

6. The motor of claim 1,
wherein the first protrusion is secured to the plurality of grooves by interference fitting or transition fitting.

7. The motor of claim 1, further comprising
insulators including the insulator,
wherein the insulators are disposed on both of the axial end surfaces of the iron core.

8. A compressor comprising:
the motor of claim 1.

* * * * *